United States Patent [19]
Zweig et al.

[11] Patent Number: 5,253,994
[45] Date of Patent: Oct. 19, 1993

[54] SYSTEM FOR MOLDING A SYNTHETIC-RESIN USING PLASTIC SCRAP

[75] Inventors: Konrad Zweig, Augsburg; Erwin Bürkle, Bichl; Markus Spötzl, München; Peter Karlinger, Augsburg, all of Fed. Rep. of Germany

[73] Assignee: Krauss-Maffei Aktiengesellschaft, München, Fed. Rep. of Germany

[21] Appl. No.: 865,173

[22] Filed: Apr. 8, 1992

[30] Foreign Application Priority Data

Apr. 11, 1991 [DE] Fed. Rep. of Germany ....... 4111751
Mar. 5, 1992 [DE] Fed. Rep. of Germany ....... 4207015

[51] Int. Cl.$^5$ ............................................ B29C 45/46
[52] U.S. Cl. .................................. 425/130; 264/328.17; 425/197; 425/205; 425/587; 366/87; 366/91
[58] Field of Search ............... 264/328.17, 328.18, 264/37; 366/76, 81, 82, 87, 89, 91, 134, 159; 425/130, 197, 205, 207, 208, 582, 587, 557

[56] References Cited

U.S. PATENT DOCUMENTS

| | | | |
|---|---|---|---|
| 2,838,801 | 6/1958 | De Long et al. | 264/37 |
| 4,005,167 | 1/1977 | Stern | 264/328.17 |
| 4,177,234 | 12/1979 | Lowry | 264/37 |
| 4,591,467 | 5/1986 | Kopernicky | 264/37 |

FOREIGN PATENT DOCUMENTS

| | | |
|---|---|---|
| 0010688 | 5/1980 | European Pat. Off. |
| 1729323 | 7/1971 | Fed. Rep. of Germany . |
| 2351328 | 4/1975 | Fed. Rep. of Germany ...... 425/208 |
| 2845650 | 4/1980 | Fed. Rep. of Germany . |
| 2815271 | 5/1980 | Fed. Rep. of Germany . |
| 2940356 | 4/1981 | Fed. Rep. of Germany : |
| 231029A1 | 12/1985 | Fed. Rep. of Germany . |
| 3538116 | 4/1987 | Fed. Rep. of Germany . |

OTHER PUBLICATIONS

"Extruder" Abstract, vol. 14 No. 46 (M-926) (3989) Jan. 29, 1990.
"Kaskaden-Extrusionssysteme Verbessern den Extrusionsprozess" F. Hensen et al, Kunststoffe 80 (1990) 6 pags. 673-678.
U. Neumann et al. "Verschiedenartige 'Abfälle . . . '", PLASTverarbeiter, 1984, No. 4.
H. Langhorst, "Wiederverwerten von Thermoplastischen Kunststoffabfällen . . . ", Kunststoffberater—1989, No. 3.

*Primary Examiner*—Jill L. Heitbrink
*Attorney, Agent, or Firm*—Herbert Dubno; Andrew M. Wilford

[57] ABSTRACT

A synthetic-resin article is molded by plastifying a virgin granulate into a fluent stream and plastifying a recycle granulate into another fluent stream. The recycle stream is then filtered while still plastified to removing particulate impurities from it. Then the filtered recycle stream while still plastified is combined with the virgin stream to form a combined stream and the combined stream is fed into a mold. The stream is mechanically filtered.

3 Claims, 4 Drawing Sheets

SYSTEM FOR MOLDING A SYNTHETIC-RESIN USING PLASTIC SCRAP

FIELD OF THE INVENTION

The present invention relates to a method of and apparatus for molding articles of a synthetic resin. More particularly this invention concerns such a system that uses recycled synthetic-resin scrap.

BACKGROUND OF THE INVENTION

It is standard to regrind sprues, runners, excess parison material, and reject parts, to plastify this reground material, and to mix it at a certain ratio with virgin compound for remolding. This system is described in detail in East German patent 231,029 of F. Endler, in German patent documents 2,815,271 of H. Geng, 2,845,650 of R. Schmidt (European equivalent application 10,688), and 3,538,116.

It is also known from German patent document 1,729,323 of E. Friederich to combine two or more streams of virgin synthetic-resin material to make a laminated article.

The recycling of synthetic resins is, however, fraught with difficulties mainly because the used containers and the like normally carry paint, metals, and various other impurities including noncombustible organic materials. Thus as described in "Verschiedenartige 'Abfälle' im Griff" (*Plastverarbeiter*, 1984, No. 4) and "Wiederverserten von thermoplastischen Kunststoffabfälle in der Extrusion (I)" (*Kunststoffberater*, 1989, No. 3) it is known to sort the plastic scrap, grind it up, plastify the particles into a stream, filter the stream, and extrude the stream as particles that are cooled into a bulk granulate. The resultant product is particles of recycled plastic that can be replastified and reused. This procedure is fairly complex so that there is no significant saving in the use of recycled material over the use of virgin material.

OBJECTS OF THE INVENTION

It is therefore an object of the present invention to provide an improved system for molding articles using recycled synthetic-resin material.

Another object is the provision of such an improved system for molding articles using recycled synthetic-resin material which overcomes the above-given disadvantages, that is which is relatively simple, cheap, and continuous.

SUMMARY OF THE INVENTION

A synthetic-resin article is molded by plastifying a virgin granulate into a fluent stream and plastifying a recycle granulate into another fluent stream. The recycle stream is then filtered while still plastified to removing particulate impurities from it. Then while still plastified the filtered recycle stream is combined with the virgin stream to form a combined stream and the combined stream is fed into a mold.

With this system therefore it is possible to produce articles continuously from virgin and recycled resin material. The filter operates continuously to strip paint particles, metal, unmeltable organic granules and the like out of the recycled-resin stream which is then combined with the virgin-resin stream, all continuously.

The stream according to the invention is mechanically filtered. The filter can be a unit having a screen that is periodically swept by a stripper arm to scrape particles off it and move them to a location where they can be washed off the screen with a small amount of the molten resin.

Since the recycle resin normally incorporates elements that gasify when heated, according to the invention, the recycle stream is degased prior to combining it with the virgin stream. This degassing can be carried out on the combined stream prior to feeding it into the mold.

In order to avoid pressure fluctuations during startup the recycle stream according to this invention is stored in plastified condition prior to combining it with the virgin stream. This also reduces degradation of the stream from the filtering operation.

Depending on the type of article being molded, the streams are combined by surrounding the virgin stream with the recycle stream or by surrounding the recycle stream with the virgin stream.

According to the invention the storage system is actually an injection-molding device or worm-type plastifier. The recycle stream is fed to either the mixing or intake zone of this device. This also avoids degrading the resins when a large-capacity plastifier is used. Introduction into the mixing zone ensures excellent combination of the various resins, as well as of any aggregate or fillers.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
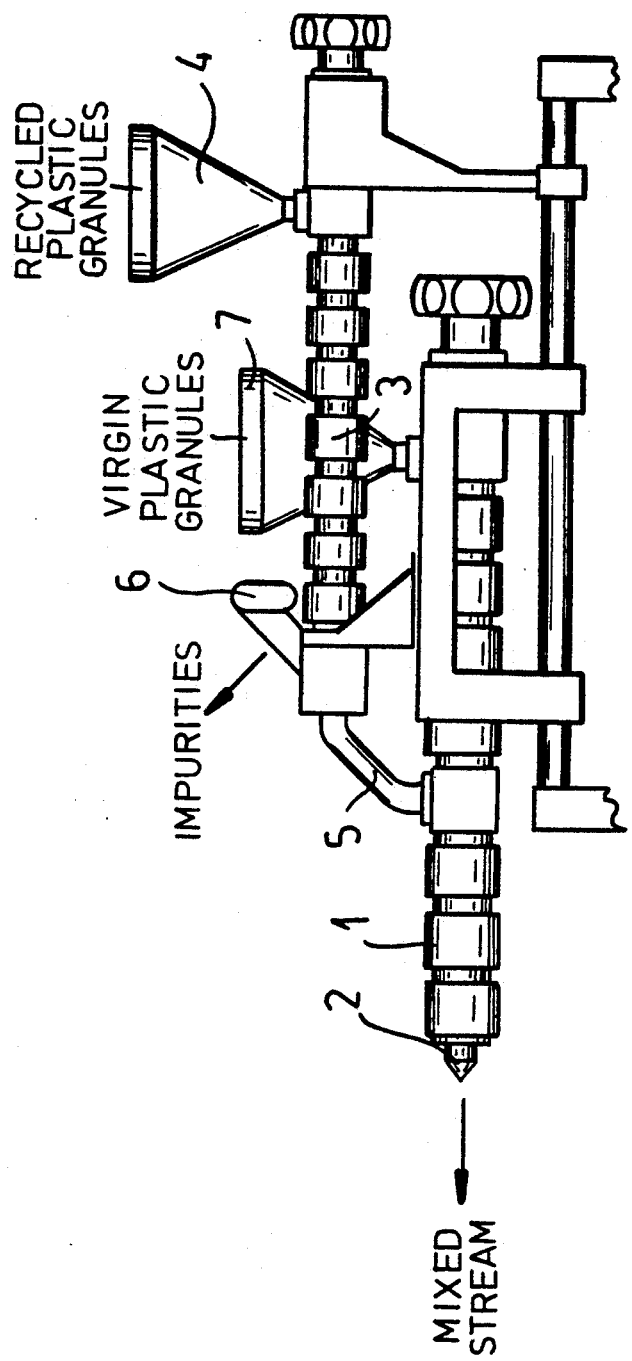
FIG. 1 is a side view of a molding system according to the invention.

As seen in FIG. 1 an extruder-type plastifier 1 has an outlet nozzle 2 at its downstream end and a fill hopper 7 for virgin compound at its upstream end. Another such plastifier 3 has its downstream end feeding into a mechanical filter 6 of the type described in the above-cited *Kunststoffberater* article and its upstream end is equipped with a fill hopper 4. Thus comminuted recycled plastic is filled into the hopper 4 and emerges as a hot plastified stream that is stripped of particulate impurities—paint and metal particles, dirt, and the like —at the filter 6 and then passes through a conduit 5 to the mixing zone of the extruder 1 where it is combined with the virgin-resin stream therein.

Figure 2:
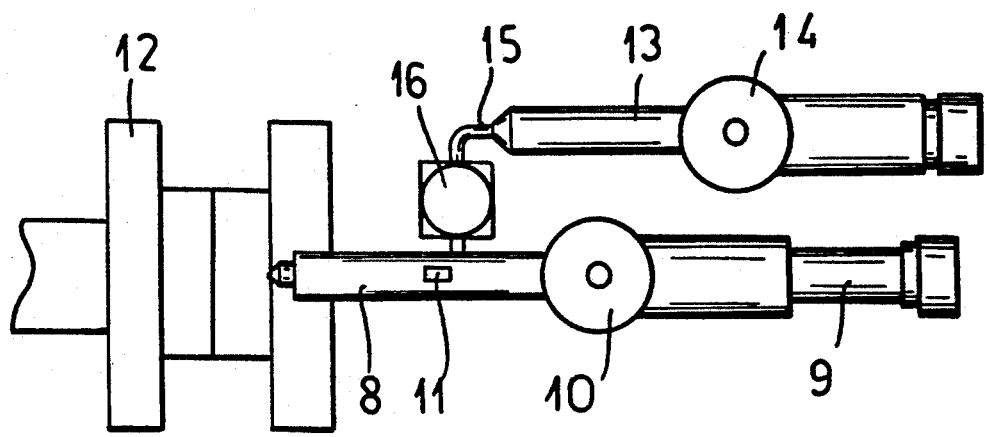
FIGS. 2 through 7 are schematic views illustrating further molding systems in accordance with this invention.

In the arrangement of FIG. 2 a plastifier for virgin materials is part of an injection-molding machine 9 having a supply hopper 10 and a degassing device 11. A second plastifier 13 also constituted as an extruder has a supply hopper 14 for communited recycled resin including impurities and an outlet 15 connected through a filter 16 to the plastifier 8 upstream of the degassing device 11. The output of the plastifier 8 is connected to a mold 12. Thus the combined streams are degased at 11.

Figure 3:
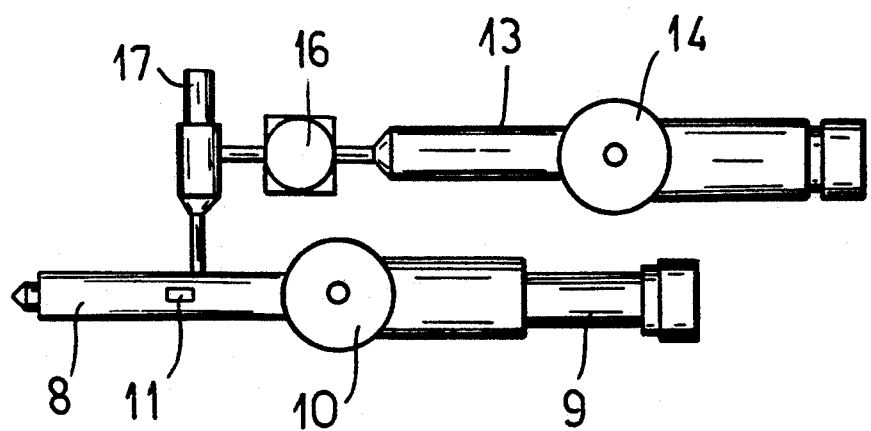

FIG. 3 shows a similar arrangement but here a storage unit 17 for molten resin is provided between the recycled-stream filter 16 and the mixing plastifier 8.

The arrangement of FIG. 4 once again is an elaboration on that of FIG. 3. Here a further plastifier 18 with a degaser 11 is interposed between the mechanical filter 16, which may incorporate a magnetic-particle stripper, and the storage unit 17. Once again the plastified, degased, and filtered stream of recycled resin is fed from the storage unit 17 to the mixing zone of the plastifier 8.

Figure 4:
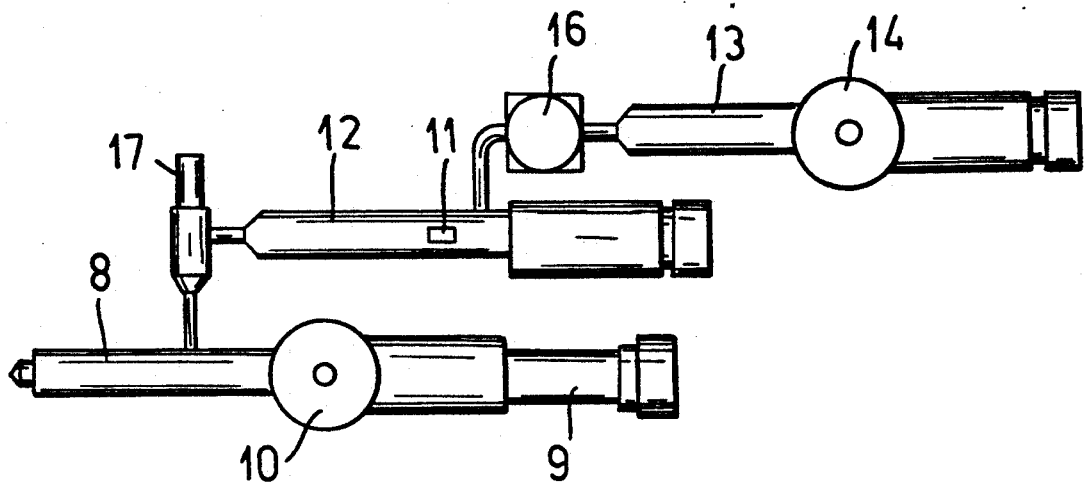
Figure 5:
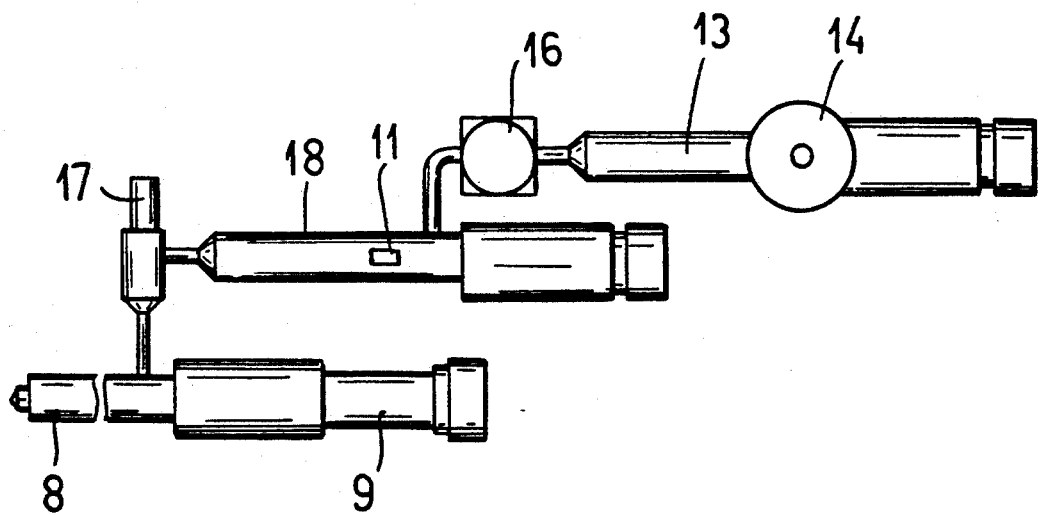

The system of FIG. 5 is identical to that of FIG. 4 except that the processed recycled-resin stream is fed into the intake zone of the plastifier 8.

Figure 6:
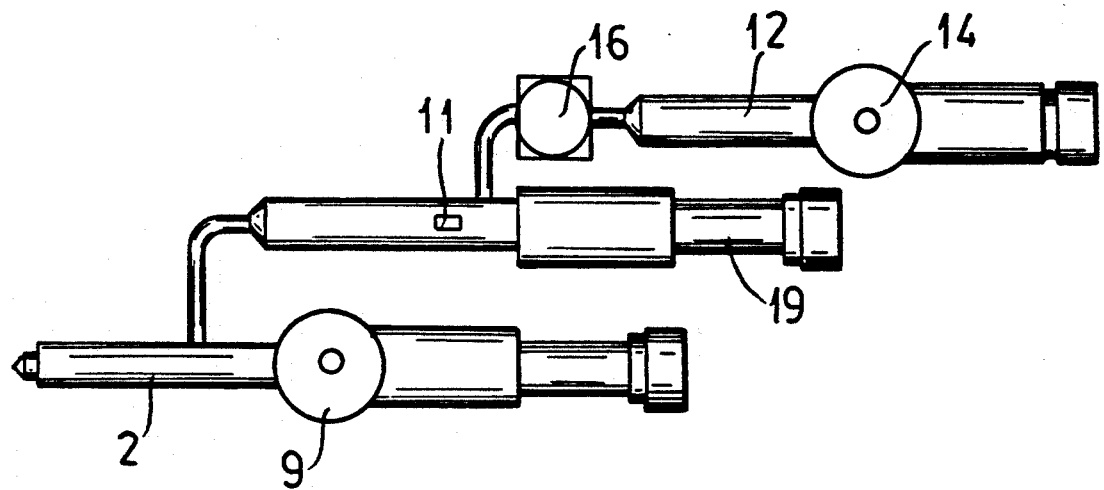

In FIG. 6 the system is identical to that of FIG. 4 but the plastifier 18 is replaced by an injection-molding device 19.

Figure 7:
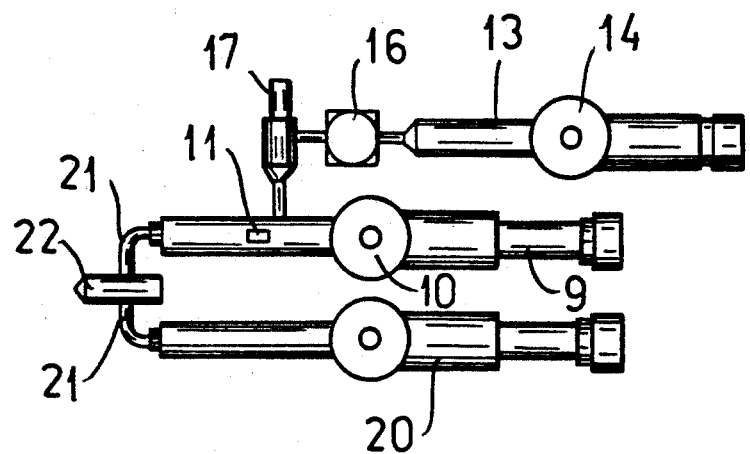

Finally in FIG. 7 the system of FIG. 4 is used but with a second extruder 20 and the two extruders 9 and 20 are connected via respective conduits 21 to a common output nozzle 2 for feeding a two-component resin thereto. This is useful when the two resins, one of which is mixed with the recycled plastic, must be kept apart until the last possible time before molding.

In all such systems it is possible either to mix the two streams, to inject the recycled-resin stream into the center of the virgin-resin stream, or to surround the virgin-resin stream with the recycled-resin stream. Furthermore other additives or resins can be added to any of the streams at any location without departing from the scope of the invention.

We claim:

1. An apparatus for molding a synthetic-resin article, the apparatus comprising:
   a mold;
   means for plastifying a virgin granulate into a fluent stream and advancing the stream;
   means for plastifying a recycle granulate into a fluent stream;
   means including an injection-molding device for storing the fluent recycle stream in molten condition;
   means for receiving the molten recycle-granulate stream from the storing means and for filtering the recycle-granulate stream while still plastified and removing unmelted particulate impurities from it;
   means for combining the filtered recycle stream while still plastified with the virgin stream to form a combined stream; and
   means for feeding the combined stream into the mold.

2. The molding apparatus defined in claim 1 wherein the injection-molding device has a mixing zone and the means for plastifying the recycle resin feeds the recycle stream to the mixing zone.

3. The molding apparatus defined in claim 1 wherein the injection-molding device has an intake zone and the means for plastifying the recycle resin feeds the recycle stream to the intake zone.

* * * * *